350-409

OR 3,811,753

United States Patent [19]
Onoki et al.

[11] 3,811,753
[45] May 21, 1974

[54] COATED OPTICAL COMPONENT MADE OF PLASTIC

[75] Inventors: Fumio Onoki, Tokorozawa; Hajime Kamiya, Kokubunji, both of Japan

[73] Assignee: Hoya Lens Co., Ltd., Tokyo, Japan

[22] Filed: Aug. 24, 1972

[21] Appl. No.: 283,329

[30] Foreign Application Priority Data
Sept. 1, 1971   Japan.................................. 46-79253

[52] U.S. Cl............. 350/175 NG, 350/178, 351/166
[51] Int. Cl................................................ G02b 1/10
[58] Field of Search........... 350/175 NG, 178, 234; 351/166

[56] References Cited
UNITED STATES PATENTS 3,458,342   7/1969   Cormia ....................... 350/175 R X
2,904,450   9/1959   Irland et al. ..................... 351/166 X

OTHER PUBLICATIONS

"Scratch–Resistant Plastic Lenses" Manufacturing Optics International, Vol. 24, No. 9 (March, April) 1971, p. 534.

*Primary Examiner*—John K. Corbin
*Attorney, Agent, or Firm*—Hill, Sherman, Meroni, Gross & Simpson

[57] ABSTRACT

An optical component made of plastics, wherein only one surface of a plastic substrate has an evaporated coating thereon, said coating having a thickness of approximately $1\mu$ to $10\mu$ and being of a vitreous material which consists essentially of silicates such as SiO and $SiO_2$.

3 Claims, 5 Drawing Figures

COATED OPTICAL COMPONENT MADE OF PLASTIC

The present invention relates to optical components employing plastics as their material, and more particularly to an improved surface construction of the optical components such as lenses of spectacles for eyesight correction or for protection, an objective and an ocular lens of a telescope or binocular telescope, and optical parts of a window, door, reflector or the like.

In general, plastics are lighter than glass in weight, and have the specific character of having a high strength-to-weight ratio and being high in the resistance against fracture. The plastics, however, have disadvantages in that they are low in surface hardness and are accordingly liable to scratches. Also their optical characteristics are prone to being lower on account of discoloration, degradation of the quality, etc. due to ultraviolet rays and moisture in the atmospheric air, and the aeration resistance is low. The plastics were therefore unsuitable for a stabilized use over a long period. Such disadvantages are properties inherent in the plastics, and are inevitable. It is known that, in order to make improvements in these respects, some trails have heretofore been conducted. In one of the trails, coatings of a vitreous material which consists of silicates such as SiO and SiO$_2$ are deposited on both the surfaces of a plastic material at a thickness of 2 – 5$\mu$ by an evaporation process. Although an optical component with the surface construction according to such method increases in hardness, the weathering resistance and so forth, its impact rupture-resisting strength becomes lower to approximately 1/15–1/20 of that intrinsic in the plastics as will be stated hereinafter. The optical component has been therefore unsuitable for practical use from the viewpoint of safety.

An object of the present invention is to provide a plastic optical component having a surface construction wherein the impact rupture-resisting strength of the optical component made of plastics is not degraded at all as compared with that intrinsic to the plastics, and the disadvantages concerned with the hardness or scratch resistance and the aeration resistance are eliminated or improvements are made therein, thereby allowing the plastic optical component to ensure safe use over a long period.

In accordance with the present invention, there is provided an optical component made of plastics, which comprises a substrate of plastics, and a coating deposited on an outside surface of said substrate by evaporation, said coating being approximately 1$\mu$ to 10$\mu$ thick and being of a vitreous material which consists essentially of silicates such as SiO and SiO$_2$.

The invention will now be described in detail with reference to the accompanying drawings, in which.

Figure 1:
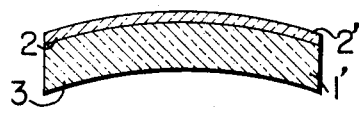
FIG. 1 is a longitudinal section of a concavo-convex lens made of plastics according to the present invention.

In general, plastics become birefringent during forming due to residual stresses attributable to non-uniformity of expansion and contraction in the forming, irrespective of the forming process. In particular, in case of plate-like moldings, tension appears in the vicinity of the surface layer, while compression occurs in the vicinity of the central inner part.

This can be noticed since, when polarized light is caused to impinge on a specimen, the polarization permeates through the specimen in a manner that it is split into two beams due to the birefringence. Further, the phase difference between the two polarized beams is measured by means of a polariscope. The phasic directions of the tension and the compression are thus judged.

In the drawings, numeral 1 designates a concavo-convex lens substrate made of plastics. Numeral 5 indicates a curve conceptually showing a stress distribution around a vertical phantom line 4 which passes through the central point of observation (0).

Figure 2:
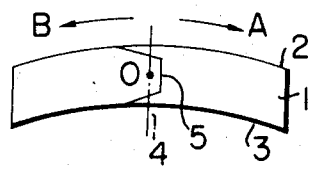
FIG. 2 is a longitudinal section showing a stress distribution in a conventional concavo-convex lens made of plastics.

FIG. 2 illustrates that compression is large in the vicinity of the central interior in a direction (A) with respect to the line 4, while tension is large in the vicinity of the inside and outside surfaces 2 and 3 in a direction (B).

Figure 3:
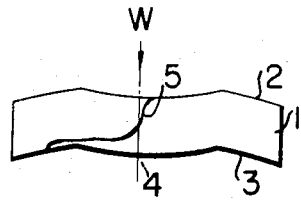
FIG. 3 is a longitudinal section of the lens in FIG. 2, showing a change of the stress distribution when an impact force is exerted on the lens.

Illustrated in FIG. 3 is that, when an impact force (W) is applied to the outside surface 2 of the lens substrate 1 in the direction of arrow, a depressed deformation is caused at the part, resulting in the stress 5. More specifically, compression arises near the outside surface layer 2, and tension near the inside surface layer 3. The compression relieves tension which has originally existed near the outside surface layer 2 of the lens substrate 1, whereas the tension appearing near the inside surface layer 3 is added to tension which has originally existed near the surface 3. The tension having existed near the surface 3 is accordingly increased still more. Consequently, when the increased tension exceeds the bonding strength of molecules constituting the plastics, it breaks the molecular bonding to give rise to a fissure at the place of tensioned. If, further, the concentration of tension arises at an extreme end of the fissure, the fissure will spread to finally cause rupture of the lens substrate 1.

The existence of tension in the surface layer of a molded article such as an optical component made of plastics, therefore tends to degrade the impact rupture- and bending-resisting strengths of the molded goods to that extent.

Figure 4:
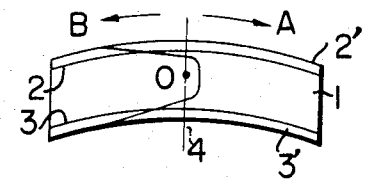
FIG. 4 is a longitudinal section showing a stress distribution in the case where coatings are deposited on both the inside and outside surfaces of the lens in FIG. 2.

Referring to FIG. 4, in the lens substrate 1 in which coatings 2' and 3' are respectively deposited on the inside and outside surfaces 2 and 3 by the evaporation process, the tensions in the vicinity of the inside and outside surface layers 2 and 3 become two to three times as large as those in the substrate with no coating as shown in FIG. 2. Since, nevertheless, the adhering coatings 2' and 3' are of material prone to rupture due to fragility and are extremely poor in impact rupture-resisting strength, the impact rupture-resisting strength of such an optical component of plastics with coatings on both the surfaces is lowered appreciably. This construction is accordingly disadvantageous in that it cannot be put into practical use.

Figure 5:
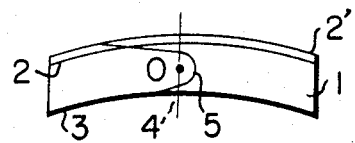
FIG. 5 is a longitudinal section showing a stress distribution in the concavo-convex lens made of plastics according to the present invention.

On the other hand, according to the present invention, the surface construction is made such that, as illustrated in FIG. 1, the coating 2' is deposited on only one surface (outside surface 2) at a thickness of 1 – 10 microns by the evaporation process, while no coating is provided on the inside surface 3. In this case, as the stress distribution 5 in FIG. 5 shows, although the tension at the outside surface 2 increases for the same reason as stated above, that at the inside surface 3 is an inherent one, originated at the plastics forming. As a result, even if the impact force (W) as in FIG. 3 is exerted, the degree of deformation of the outside surface 2 will be the same extent as for constructions having the coatings on both the surfaces, and will be lower than in constructions having no coating. On the other hand, the degree of deformation of the inside surface 3 is lower than in the construction with the coatings on both the surfaces, and is equal to that of the construction without any coating.

For this reason, the optical component made of plastics according to the present invention wherein the coating 2' is disposed on only one side of the outside surface 2 by the evaporation process, improves the impact rupture-resisting property, hardness, scratch resistance and aeration resistance which are intrinsic during the forming of the plastics, and can accordingly be put into a stable use for a long period of time.

As regards the thickness of the coating 2', one below 1 micron is in effective in scratch resistance and aeration resistance. On the other hand, the surface coating construction of a thickness above 10 $\mu$ is disadvantageous in being impractical because, not only are difficulties in manufacture attendant, but also cracks of the coating are liable to appear.

Examples of the optical component according to the present invention, the optical component with both the inside and outside surfaces coated, and the optical component not coated are given below.

ited on both the inside and outside surfaces at a thickness of 5$\mu$ by the conventional evaporation process.

Sample B: A lens which is the same in material, structure and shape as Sample A, and which has a surface construction wherein the same coating as in Sample A is deposited on only one side of the outside surface. That is, Sample B has the surface construction according to the present invention.

Sample C: A lens which is the same in material, structure and shape as Sample A, and which has a surface construction wherein no coating is deposited at all.

Table 1 gives the percentage of fissures and/or ruptures of the respective samples as have occurred in consequence of the tests conducted as follows. 50 test pieces were prepared for each of Samples A, B and C. With the outside surface facing or the convex surface upwards, each test piece was placed on a steel ring-shaped support having a diameter equal to that of each sample and a thickness of 5 mm. Steel balls weighting 5 gm. for Sample A and weighing 28 gm. for Samples B and C were caused to freely fall onto the respective samples from directly above them. Thus, impact was imparted to the central part of each test piece.

TABLE 1.—PERCENTAGE OF OCCURRENCE OF FISSURES AND/OR RUPTURES OF SAMPLES

| Sample A; Steel ball, 5 g.: | | | | | |
|---|---|---|---|---|---|
| Falling height, centimeters | 30 | 40 | 50 | 60 | 70 |
| Percentage of occurrence | 0 | 10 | 50 | 80 | 100 |
| Sample B; Steel ball, 28 g.: | | | | | |
| Falling height, centimeters | 160 | 170 | 180 | 190 | 200 |
| Percentage of occurrence | 0 | 0 | 10 | 40 | 80 |
| Sample C; Steel ball, 28 g.: | | | | | |
| Falling height, centimeters | 160 | 170 | 180 | 190 | 200 |
| Percentage of occurrence | 0 | 0 | 0 | 20 | 60 |

EXAMPLE 2

A test piece of each of Samples B and C as in Example 1 was prepared, and the pair of test pieces were respectively fitted to the right and left parts of a single spectacle frame. The spectacles were used for eighty days. Then, observations with the eye were made of the scratch resistance. The results are listed in Table 2.

Table 2 State of Occurrence of Scratches

TABLE 2.—STATE OF OCCURRENCE OF SCRATCHES

| | Period (days) | | | | | | | |
|---|---|---|---|---|---|---|---|---|
| | 10 | 20 | 30 | 40 | 50 | 60 | 70 | 80 |
| Sample B: | | | | | | | | |
| Outside surface | X | X | X | X | X | △ | △ | △ |
| Inside surface | X | X | X | △ | △ | △ | △ | ○ |
| Sample C: | | | | | | | | |
| Outside surface | X | △ | ○ | ○ | ○ | ◎ | ◎ | ◎ |
| Inside surface | X | X | △ | △ | △ | ○ | ○ | ○ |

NOTE:
1. It is obvious that Sample A will attain results equivalent to or better than those of Sample B, and hence, no test was carried out.
2. Symbols: X = Quite no scratches were noticed; △ = Indistinct scratches were noticed; ○ = Distinct scratches were noticed; ◎ = A number of distinct scratches were noticed.

EXAMPLE 1

Falling ball tests for measuring the impact rupture-resisting strengths of the optical components made of plastics were conducted with a method which is fundamentally the same as those specified in the Japanese Industrial Standards (JIS) T 8146 and the American Engineering Standards. The results are listed in Table 1. In the table, Sample A: A concavo-convex lens made of polycarbonate, which has a diameter of 60 mm and a thickness of 2.5 mm, and which has a surface construction wherein vitreous coatings of SiO and $SiO_2$ are depos- It is apparent from the foregoing examples 1 and 2 that Sample B or the optical component of plastics according to the present invention is more excellent in the impact rupture-resisting strength than the otpical component of plastics of Sample A and in the scratch resistance than the otpical component of plastics of Sample C. With the improvements, the optical component of plastics according to the present invention is suitable for a stable use over a long period.

What we claim is:

1. An optical component made of plastics, comprising a substrate of plastics having outside and inside surfaces and a coating deposited on only said outside surface of said substrate by evaporation, said coating being approximately 1μ to 10μ thick and being of a vitreous material which consists essentially of silicates SiO and $SiO_2$ and said coating on only the outside surface substantially improves the impact rupture strength of said optical component.

2. An optical component made of plastics as defined in claim 1, wherein said outside surface is convex, while said inside surface of said substrate is concave, thereby forming a concavo-convex lens.

3. An optical component made of plastics as defined in claim 2, wherein said plastics are polycarbonate.

* * * * *